United States Patent [19]
Kozdon

[11] 4,322,722
[45] Mar. 30, 1982

[54] PULSED MICROWAVE MOTION SENSOR FOR INTRUSION DETECTION APPLICATIONS

[75] Inventor: Peter J. Kozdon, Santa Clara, Calif.

[73] Assignee: DTI Security, a Division of Datura International, Inc., Sunnyvale, Calif.

[21] Appl. No.: 161,279

[22] Filed: Jun. 20, 1980

[51] Int. Cl.³ .................. G01S 13/56; G08B 13/18
[52] U.S. Cl. .................. 340/554; 340/552; 343/5 PD; 343/17.1 PF; 367/94; 367/901
[58] Field of Search ............ 340/552, 554; 343/5 PD, 343/5 PN, 17.1 R, 17.1 PF; 367/94, 901

[56] References Cited

U.S. PATENT DOCUMENTS

| | | | |
|---|---|---|---|
| 2,779,935 | 1/1957 | Loudon et al. | 367/94 X |
| 3,866,198 | 2/1975 | Cohen | 367/94 X |
| 3,925,687 | 12/1975 | Solomon | 343/5 PD X |
| 4,028,690 | 6/1977 | Buckley et al. | 340/552 |
| 4,072,944 | 2/1978 | Bianco et al. | 343/5 PN X |

Primary Examiner—John W. Caldwell, Sr.
Assistant Examiner—Joseph E. Nowicki
Attorney, Agent, or Firm—Claude A. S. Hamrick

[57] ABSTRACT

An intrusion detection apparatus including a sensor for sensing an objectionable interference phenomenon within a detection area and developing a pulse train coincident therewith, signal processing circuitry responsive to the pulse train and operation to actuate a Gunn diode microwave generator or the like in a pulsed manner causing it to transmit microwave energy into the detection area in synchronism with the interference phenomenon, a microwave receiver for detecting microwave energy reflected from the detection area and for developing detection signals indicating motion within the monitored area, and further signal processing circuitry responsive to the detection signal and operative to actuate an alarm or the like.

10 Claims, 3 Drawing Figures

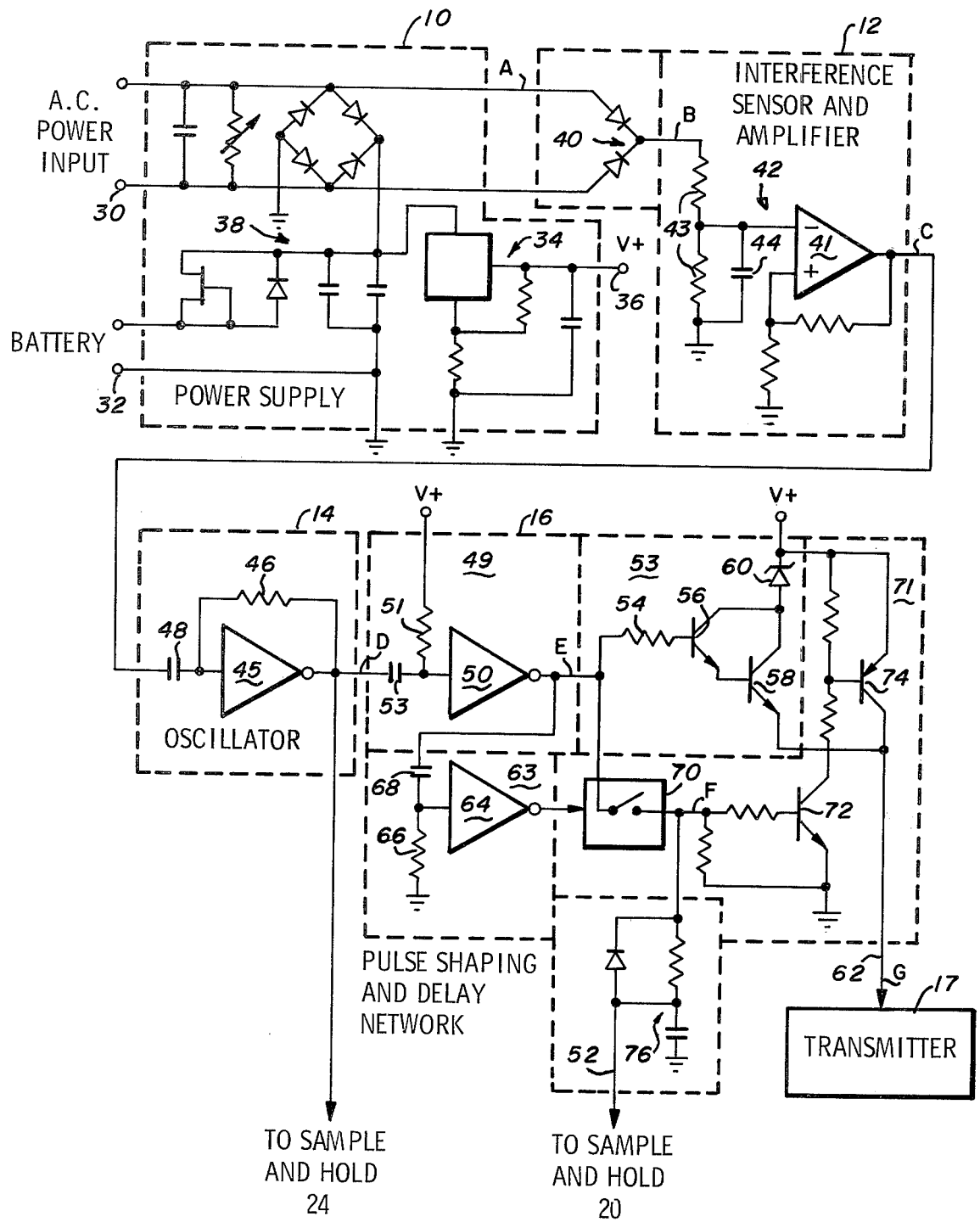
Fig_1

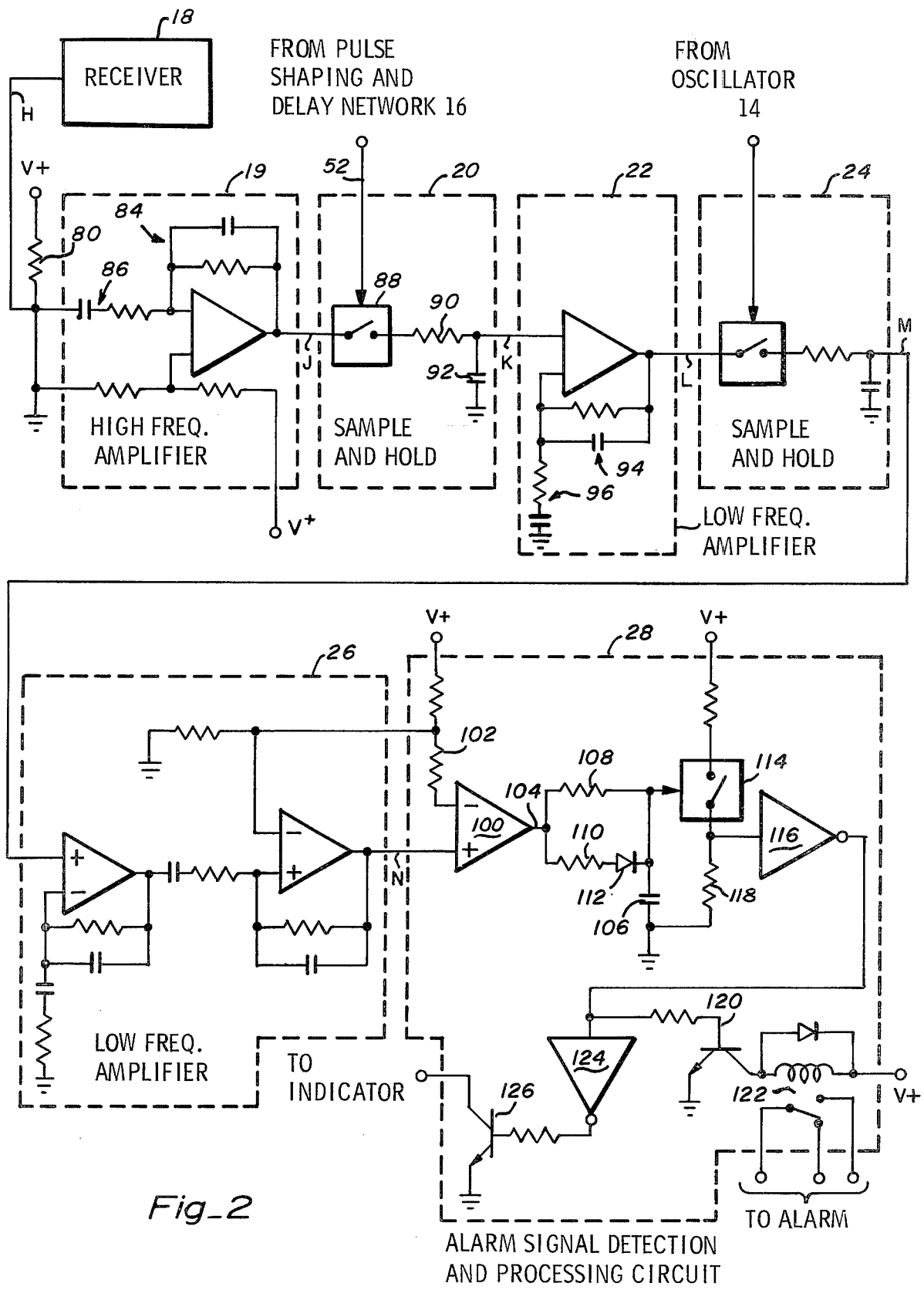
Fig_2

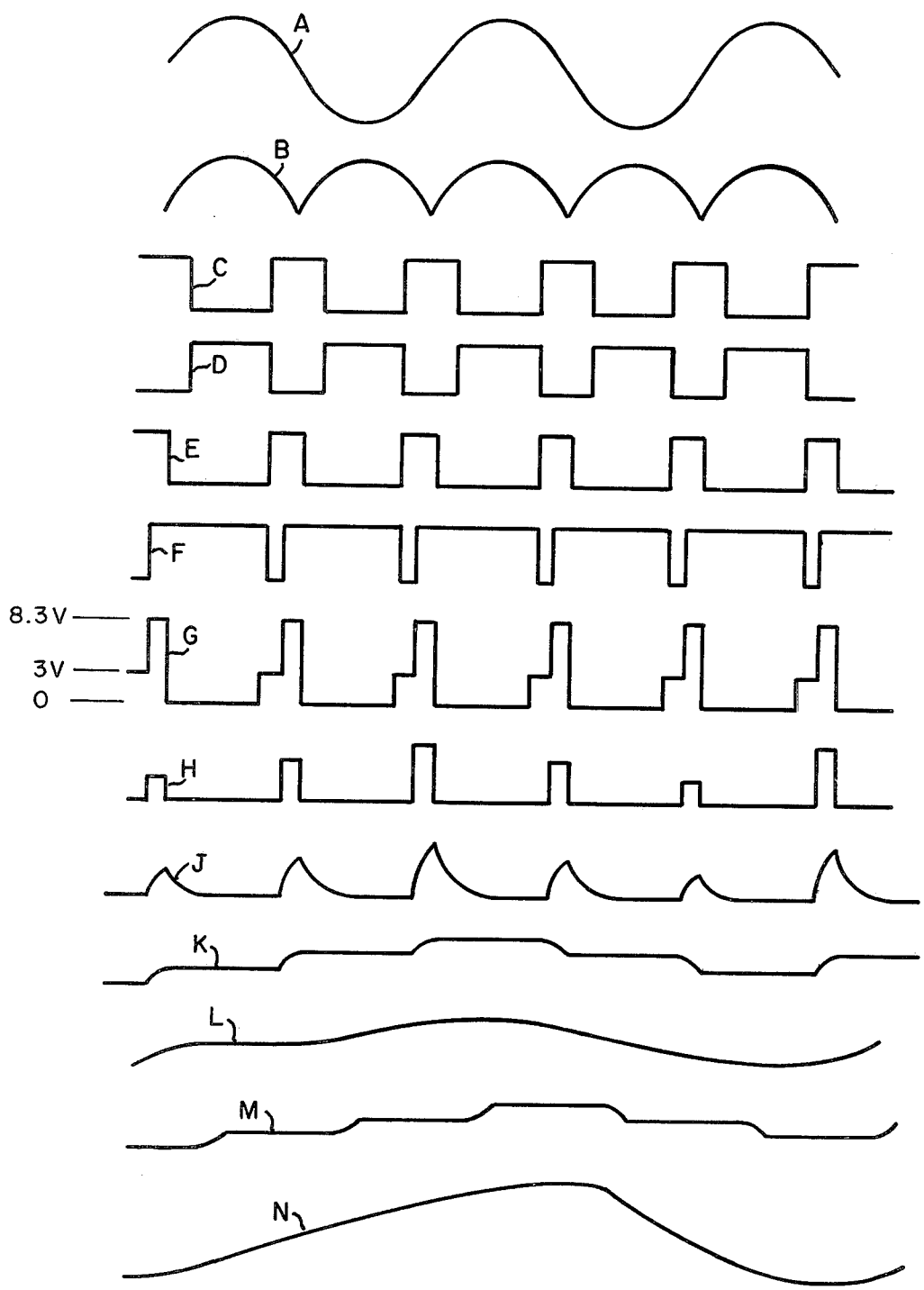
Fig_3

PULSED MICROWAVE MOTION SENSOR FOR INTRUSION DETECTION APPLICATIONS

BACKGROUND OF THE INVENTION

1. Field of the Invention

The present invention relates generally to microwave motion sensing apparatus and more particularly to an improved sensing system which uses pulsed microwave transmission and digital type filtering to substantially improve its efficiency and operational accuracy.

2. Description of the Prior Art

Prior art microwave motion sensing devices consist of a simple transmit and receive module or modules followed by a bandpass amplifier and signal processing circuitry. The system includes a DC power input that is used to energize a mirowave source and set up a mirowave oscillation which is transmitted into a detection area to be monitored. A portion of the transmitted energy will be reflected from the surrounding environment and any moving objects within the monitored field and will be returned to the source where it is received in the receiving portion of the device. The received energy is detected as a steady state DC level representing the reflection of any static objects plus a small AC, Doppler component representing any motion within the detection area. The detected output is then AC coupled into a bandpass amplifier having a bandpass of about 5 to 90 Hz so as to remove the DC components therefrom. The amplifier provides the gain required to bring the signal up to whatever level is necessary to indicate that there is or is not motion within the scanned region.

One of the disadvantages of such circuitry is that it requires the application of continuous power to the unit, typically on the order of 12 volts at about 150 milliamps, or about 1.8 watts of power. It therefore requires the provision of a fairly large and expensive auxiliary battery to assure operation of the system for a suitable duration in the event of line power failure.

Another problem with the prior art circuits relates to interference caused by the power supply frequency. Although the 60 Hz frequency itself is not much of a problem and can easily be dealt with, other components higher in frequency provide very annoying sources of interference. One of the most troublesome sources is fluorescent lighting fixtures disposed within the detection field. Since such fixtures have a discharge frequency of 120 Hz (twice the power supply frequency) every time the gas in a fluorescent tube ionizes, it causes the equivalent of a metallic conductor to appear in and then disappear from the detection field at a rate (120 Hz) which corresponds to motion at approximately 4 mph or within the walking range of a human. Although an accurately adjusted bandpass characteristic of the amplifier can filter out this frequency, due to the limitations of conventional analog circuitry, obtaining and maintaining desirable accuracy is difficult and requires manual adjustment. Consequently, the detection units must be very carefully placed so as not to be influenced by fluorescent lights, or alternatively, the system must only be used when the fluorescent lighting fixtures are turned off. Other similar sources of interference include motors, fans, etc., which are typically synchronized to 60 Hz or multiples thereof.

SUMMARY OF THE PRESENT INVENTION

It is therefore a primary objective of the present invention to provide a microwave motion detection system having substantially reduced power consumption as compared to related prior art devices.

Another objective of the present invention is to provide a detection system of the type described wherein the power applied to the microwave transmitter device is pulsed at a rate which is synchronous with a significant source of interference rather than provided continuously.

Still another objective of the present invention is to provide a detection system of the type described which requires a substantially smaller auxiliary battery than that required by prior art systems.

Briefly, a preferred embodiment of the present invention includes a sensor for sensing an objectionable interference phenomenon within a detection area and developing a pulse train coincident therewith, signal processing means responsive to the pulse train and operation to actuate a Gunn diode microwave generator or the like in a pulsed manner causing it to transmit microwave energy into the detection area in synchronism with the interference phenomenon, a microwave receiver for detecting microwave energy reflected from the detection area and for developing detection signals indicating motion within the monitored detection area, and signal processing means responsive to the detection signal and operative to actuate an alarm or the like.

An important advantage of the present invention is that it ignores interfering phenomenon such as fluorescent lighting, motor vibration or the like within the detection area.

Another advantage of the present invention is that it consumes substantially less power than prior art systems and thus has much smaller battery requirements for auxiliary power.

These and other objects and advantages of the present invention will become apparent to those skilled in the art after having read the following detailed disclosure of a preferred embodiment illustrated in the drawing.

IN THE DRAWING

FIGS. 1 and 2 are circuit diagrams schematically illustrating the transmit and receive portions of an intrusion detection apparatus in accordance with the present invention; and FIG. 3 is a timing diagram schematically illustrating signal waveforms at various points within the circuit of FIG. 1.

DETAILED DESCRIPTION OF THE PREFERRED EMBODIMENT

Referring now to FIGS. 1 and 2 of the drawing, a schematic diagram is shown of a microwave motion detection system in accordance with the present invention. The principal operative components of the system are segregated by dashed lines and include a power supply 10, an interference sensor/amplifier 12, an injection locked oscillator 14, a pulse shaping and delay circuit 16, a microwave source 17, a microwave receiver 18, a high frequency amplifier 19, a first sample and hold circuit 20, a first low frequency amplifier 22, a second sample and hold circuit 24, a second low frequency amplifier 26, and signal detection and processing circuitry 28 for actuating suitable alarm means and indicator means.

Power supply 10 has a pair of input terminals 30 for receiving line power and includes voltage regulation circuitry 34 for developing an 8.5 volt DC source of V+ power at terminal 36 for operating the remaining circuitry. Power supply 10 also includes standard rectifying and regulator circuitry suitable for maintaining a predetermined charge on an auxiliary battery connected across the terminals 32.

The interference sensor and amplifier 12 is a device which generates pulses at the frequency of the interfering phenomenon to be avoided. In the preferred embodiment the primary interference phenomenon to be provided against is fluorescent lighting which operates at 120 Hz. A simple diode rectifier 40 is connected across the line terminals 30 for rectifying the 60 Hz line signal and providing a waveform (see waveform B—FIG. 3) from which a 120 Hz pulse train that is in synchronism with any local fluorescent lighting can be derived. Alternatively, one could use a photo-sensitive device which measures the intensity of the fluorescent light level or a zero crossing detector which detects zero crossings of the line frequency. A comparator which detects line voltage amplitude or a magnetic sensor which picks up interfering mechanical motion, such as fan blades or vibration caused by a motor or the like, could also be used.

The amplifier portion 42 of unit 12 consists of a high gain amplifier 41, the input of which is coupled to sensor 40 by means of a voltage divider 43 and smoothing capacitor 44. Amplifier 42 will develop a train of pulses (see waveform C—FIG. 3) at its output which are time coincident with the output of sensor 40. If the sensor were to be a photodetector, then substantial preamplification might be required to amplify the signal before input to the amplifier 42. On the other hand, if the signal is of a high level the preamplifier would not be required. Depending on the particular type of detector used, it is also possible that some of the harmonics of the fluorescent fixture frequency may be greater in amplitude than the main frequency. Such harmonics could be eliminated by the use of a suitable bandpass amplifier.

The output of amplifier 41 is used either to phase lock or injection lock an oscillator 14 which is provided to insure the continuance of the 120 Hz signal in the event that line power fails, or where a light sensing or other similar detector is used and the fluorescent lighting fixture is turned OFF. In the illustrated injection locked oscillator 14 the incoming frequency overrides any frequency determining components within the oscillator and causes it to merely operate as an inverting amplifier. However, should line power be lost, the resistor 46 and capacitor 48 will cause the circuit to function as an oscillator and develop a train of approximately 120 Hz pulses (see D—FIG. 3) similar to that generated when sensor 40 is operational.

Pulse shaping and delay network 16 includes a pair of monostable multivibrators 49 and 63, a warmup voltage applying circuit 53, a switch 70, an operating voltage applying circuit 71 and a delay circuit 76. The first monostable multivibrator 49 that generates a pulse (see E—FIG. 3) at the beginning of each of the 120 Hz pulses. Such pulses are used to apply power to the microwave source 17. The duration of the pulses generated by multivibrator 49 is determined by the resistor 51 and capacitor 53. In the preferred embodiment, the pulse duration is selected to be approximately 1 msec.

The output of multivibrator 49 is applied to circuit 53 through a current limiting resistor 54 to the base of the first of a pair of transistors 56 and 58 which are connected together in a Darlington configuration. The circuit provides a switch for coupling V+ through a zener diode 60 to the input 62 of a microwave transmitting source 17, typically including a Gunn oscillator. Where the V+ voltage is 8.5 volts the zener diode will function to limit the voltage applied to input 62 via the Darlington switch to less than the threshold voltage of the Gunn oscillator, i.e., approximately 3 volts, thereby applying only warm-up power to the device.

The output of multivibrator 49 is also input to a second monostable multivibrator 63 which likewise includes an inverter 64, a resistor 66 and a capacitor 68. As a result of the values selected for resistor 66 and capacitor 68, generates pulses (see F—FIG. 3) having durations of less than those of the pulses developed by multivibrator 49. In the preferred embodiment, the duration of each pulse developed by multivibrator 63 is ½ msec. These pulses are applied to the control input of a normally closed switch 70 causing it to open at the start of the output pulse generated by multivibrator 50 and then close again at the end of the pulse generated by multivibrator 63. Since the output of multivibrator 49 is still high when the output of multivibrator 63 times out, switch 70 will cause the output of multivibrator 49 to be input to circuit 71 and applied to the base of an NPN transistor 72 which is caused to conduct and pull down the base of PNP switching transistor 74 rendering it conductive. As transistor 74 conducts, it connects the full 8.5 volt supply to the input of the transmit device 17. When the full V+ voltage is applied to transmitter 17 the microwave source contained therein develops a pulse of microwave energy which is transmitted into the monitored field.

This operation may be more clearly understood by referring to FIG. 3. Waveform D depicts the 120 Hz pulse train input to multivibrator 49. Waveform E depicts the output pulses developed by multivibrator 49 while waveform F represents the output developed by multi-vibrator 63. Waveform G is the resultant signal developed on output line 62 for driving the transmitter 17. Note that the first portion of each pulse G rises to a subthreshold level of approximately 3 volts so as to preheat the Gunn diode microwave signal generator without causing it to transmit microwave energy. The second portion of each pulse G rises to a level of about 8.5 volts which is sufficient to drive the Gunn diode device to its full ON condition.

The signal developed on the output side of switch 70 is also applied to a delay circuit 76 which developes a delayed signal on line 52 that is used to control the signal receiving portion of the system.

As each burst of microwave energy is transmitted by the source 17, a portion thereof will be reflected back from objects in the monitored field and be picked up by a detector in the receiver 18. The illustrated resistor 80 provides proper biasing for the receiver 18. The output from receiver 18 contans a DC component proportional to the energy that is reflected from static obstructions within the field plus a Doppler component which corresponds to motion of any object within the monitored field (see H—FIG. 3).

Amplifier 19 is bandwidth limited by the resistor and capacitor circuits 84 and 86 so as to have a bandwidth which is compatible with the frequency range of interest and serves to reduce the low frequency noise present in the signals. Typically, this range extends from about 200 Hz to 3 kHz. The pulses (see J—FIG. 2) developed at the output of amplifier 19 are thus an amplified but filtered version of the pulses developed by the receiver detector but are delayed for a short period of time relative to the input pulses due to the time constants of the amplifier 19.

The first sample and hold circuit 20 provides a means for storing the amplitude of the detected pulses and includes a switch 88, resistor 90 and a storage capacitor 92. Circuit 20 is actuated by the control signal developed by network 16 on line 52. In response to the control signal, circuit 20 stores the amplitudes of the pulses input thereto by amplifier 19. In the event that a following pulse should have a different amplitude then its preceding pulse, then the output of circuit 20 will be changed to correspond to that amplitude. The output of sample and hold circuit 20 is thus a varying DC level which is illustrated at K in FIG. 2 is proportional to the amplitude of the input pulses received.

The low frequency amplifier 22 has a pass band determined by the RC pairs 94 and 96 and is used to amplify the low frequency Doppler information contained in the charge on capacator 92 (see L—FIG. 3). However, since the signal pulses J are quite short, very small capacitors 92 must be used and such devices do not hold a charge very well. In order to improve the signal (see M—FIG. 3) a second sample and hold circuit 24 having a much longer time constant and thus a much larger capacitor may be used. This second sample and hold circuit is not an absolute essential to the operation of the circuit, but when used, provides a minor improvement in operation of the device.

A further stage 26 of low frequency amplification follows circuit 24 to bring the signal (see N—FIG. 3) up to a level so that it can be easily handled by subsequent circuitry.

The alarm signal detection and processing circuit includes a threshold detector 100 which detects excursion of signal N above an alarm level determined by a voltage divider 102 and develops an output at 104 that is used to charge a storage capacitor 106 via resistors 108 and 110, and diode 112. In the event that capacitor 106 charges above a predetermined level, switch 114 will be closed so as to apply an input to inverter 116 via the pull down resistor 118. The output of inverter 116 will then go low turning OFF transistor 120 and deenergizing relay 122. As the normally energized relay 122 is deenergized it will cause an alarm to be signaled. The output of inverter 116 may also be input to another inverter 124 and used to drive a transistor 126 which closes a circuit to actuate an indicator.

The principal problems to be solved by the present invention relate to excessive current consumption and fluorescent light interference. This circuit solves both problems inexpensively and efficiently and requires a minimum of testing. Moreover, power consumption is improved as much as five-fold by the same signal chopping action that is used to solve the fluorescent light interference problem.

It is well known that a Gunn diode transitions into its ON condition with a rapid change in frequency which may give rise to undesirable spurious signals. By bringing the device to the 3 volt level to pre-warm it before turning it ON, some of the spurious signals can be eliminated, thus allowing the system to more easily comply with FCC regulations.

Another advantage of the present invention is that it allows several transmit/receive units to be used in close proximity to each other without covern that one unit will interfere with operation of another. This is made possible by the fact that since each unit is caused to transmit and receive only during a portion of each ½ cycle, units having overlapping signal ranges can be caused to transmit and receive at different times during each ½ cycle and thus avoid the possibility of interference. This also makes installation much simpler because the installer need not take special care to avoid overlap of microwave signal frequencies.

Although the above description has been directed to a single preferred embodiment of the present invention, it is contemplated that numerous alterations and modifications thereof will become apparent to those skilled in the art after having read this disclosure. It is therefore intended that the following claims be interpreted as covering all such alterations as fall within the spirit and scope of the invention.

What is claimed is:

1. A microwave intrusion alarm apparatus for energizing an alarm when motion is sensed within a detection area comprising;
   transmitter means for transmitting microwave energy into a detection area;
   sensor means for detecting an interference signal and generate a timing signal which is time coincident with said interference phenomenon occuring within said detection area;
   oscillator means coupled to the output of said sensor means and operative to develop a simulated interference signal in the event that said interference signal ceases to exist indicating that said predetermined phenomenon ceases to exist within said detection area;
   signal generating means responsive to said interference signal and said simulated interference signal and operative to generate a train of pulses for periodically energizing said transmitter means and causing it to transmit bursts of microwave energy into said detection area, said burst of energy being time coincident with said interference phenomenon, said signal generating means also being operative to generate detection control signals;
   alarm signaling means;
   energy receiving means for detecting microwave energy reflected from objects within said detection area and operative to develop a motion detection signal which is proportional to any Doppler energy received by said receiving means; and
   signal processing means responsive to said detection control signals and operative to actuate said alarm signaling means in the event that said detection signal exceeds a predetermined threshold value.

2. A microwave intrusion alarm apparatus as recited in claim 1 wherein said sensor means is a frequency doubler which when coupled to an external ac power source develops an interference signal having twice the frequency of the source frequency.

3. A microwave intrusion alarm apparatus as recited in claim 1 wherein said oscillator means is an injection locked oscillator which locks onto said interference signal when said interference signal exists and which developes said simulated interference signal when said interference signal ceases to exist.

4. A microwave intrusion alarm apparatus as recited in claim 1 wherein said signal generating means includes circuit means for supplying a first level of power to said transmitter means during a first portion of each pulse of said train of pulses and for supplying a second level of power to said transmitter means during a second portion of each pulse of said train of pulses.

5. A microwave intrusion alarm apparatus as recited in claim 4 wherein said transmitter means includes a Gunn diode means and wherein said first level of power is below the operational threshold thereof and said second level of power is above the operational threshold thereof.

6. A microwave intrusion alarm apparatus as recited in claim 1 wherein said signal processing means includes sample and hold circuitry energized by said detection control signals and operative to develop said motion detection signal by periodically sampling and storing the level of said motion detection signal.

7. A microwave intrusion alarm apparatus as recited in claim 4 or 5 wherein said circuit means includes means responsive to said interference signal or simulated interference signal and operative to develop a first pulse for each such signal the duration of which determines the time that power is applied to said transmitter means.

8. A microwave intrusion alarm apparatus as recited in claim 7 wherein said circuit means further includes means responsive said first pulse and operative to develop a second pulse the duration of which determines the time that the power applied to said transmitter means is at said first level.

9. A microwave intrusion alarm apparatus as recited in claim 8 wherein said circuit means further includes first switching means responsive to said first pulse and operative to apply said first level of power to said transmitter means, and second switching means responsive to said second pulse and operative to apply said second level of power to said switching means.

10. A microwave intrusion alarm apparatus as recited in claim 2, 3 or 6 wherein said signal generating means includes circuit means for supplying a first level of power to said transmitter means during a first portion of each pulse of said train of pulses and for supplying a second level of power to said transmitter means during a second portion of each pulse of said train of pulses.

* * * * *